(12) United States Patent
Yen et al.

(10) Patent No.: US 10,174,921 B2
(45) Date of Patent: Jan. 8, 2019

(54) SLIM OLED LAMP

(71) Applicants: Feng-Wen Yen, Taipei (TW);
Cheng-Hao Chang, Miaoli (TW);
Ching-Yan Chao, Hsinchu (TW);
Yuan-Hui Wang, Taipei (TW)

(72) Inventors: Feng-Wen Yen, Taipei (TW);
Cheng-Hao Chang, Miaoli (TW);
Ching-Yan Chao, Hsinchu (TW);
Yuan-Hui Wang, Taipei (TW)

(*) Notice: Subject to any disclaimer, the term of this patent is extended or adjusted under 35 U.S.C. 154(b) by 0 days.

(21) Appl. No.: 15/863,992

(22) Filed: Jan. 8, 2018

(65) Prior Publication Data

US 2018/0195702 A1    Jul. 12, 2018

(51) Int. Cl.
| | | |
|---|---|---|
| *F21V 21/28* | (2006.01) | |
| *F21V 21/30* | (2006.01) | |
| *F21S 6/00* | (2006.01) | |
| *F21V 17/00* | (2006.01) | |
| *F21V 23/04* | (2006.01) | |
| *F21Y 115/15* | (2016.01) | |
| *F21V 7/05* | (2006.01) | |
| *F21V 21/06* | (2006.01) | |

(52) U.S. Cl.
CPC ............ *F21V 21/30* (2013.01); *F21S 6/003* (2013.01); *F21V 17/007* (2013.01); *F21V 23/0485* (2013.01); *F21V 7/05* (2013.01); *F21V 21/06* (2013.01); *F21Y 2115/15* (2016.08)

(58) Field of Classification Search
CPC ........ F21V 21/30; F21V 21/06; F21V 17/007; F21V 7/05; F21Y 2115/15; F21Y 23/0485; F21S 6/003
See application file for complete search history.

(56) References Cited

U.S. PATENT DOCUMENTS

| | | | |
|---|---|---|---|
| 2012/0206050 A1* | 8/2012 | Spero | ........................ B60Q 1/04 315/152 |
| 2014/0265905 A1* | 9/2014 | Ray | ........................... F21S 9/02 315/210 |

FOREIGN PATENT DOCUMENTS

| | | | |
|---|---|---|---|
| CN | 201706319 U | * | 1/2011 |
| CN | 103994361 A | * | 8/2014 |
| CN | 205191330 U | | 4/2016 |
| CN | 105546400 A | | 5/2016 |

* cited by examiner

*Primary Examiner* — Ali Alavi

(57) ABSTRACT

A slim OLED lamp is provided, which may include a lamp holder, a support, and a base. The support connects the base to the lamp holder. When the lamp holder, support, and base are folded to be in the same plane, the lamp holder, the support, and the base can be close to and adjacent to one another. A light-emitting unit manufactured by the organic light-emitting technology can be plugged into the lamp holder, so the light-emitting unit can be conveniently replaced. There is at least one rotation direction between the support and lamp holder, so the freedom degree of the illumination range of the light-emitting unit can be increased. The base includes a control unit applicable to various light-emitting units with different rating currents so as to adjust the brightness thereof.

8 Claims, 4 Drawing Sheets

SLIM OLED LAMP

CROSS-REFERENCE TO RELATED APPLICATIONS

This application claims the benefit of priority of TW Patent Application Ser. No. 106200324 filed on Jan. 9, 2017, the content of which is incorporated herein by reference in its entirety.

FIELD OF INVENTION

The present invention relates to a slim lamp, in particular to a slim OLED lamp, the parts of which may be folded to be compact in a plane.

BACKGROUND OF THE INVENTION

In general, the conventional table lamp includes three parts, i.e. the base, the support, and the lamp holder. The base is connected to one end of the support and the lamp holder is connected to the other, such that both the base and the lamp holder can rotate with respect to the support in order to adjust their relative positions, respectively. However, when not in use, the table lamp occupies a lot of space of the table. In addition, the volume of the table lamp is still large when the base, the support and the lamp holder are folded together, so it is very inconvenient to carry and transport the table lamp.

Accordingly, various foldable table lamps have been developed to solve the above problems. For example, Chinese utility model patents Nos. CN202813009U, CN205191330U, CN205316209U, or CN204477884U, or Chinese patent application publication Nos. CN105546400A, CN10591009A, etc. However, the volume of these currently available foldable table lamps is still too large even if being folded. Folding the base, the support, and the lamp holder together still can't reduce the volume of the table lamp significantly, resulting in high cost of packaging and transportation. Moreover, the rotation angle and the rotation direction of the parts of the conventional table lamps are limited and can't be adjusted arbitrarily to provide proper lighting effect for different applications.

Furthermore, for embedded-type LED table lamps, the service life of the LEDs installed in the lamp holder is limited. When the LEDs malfunction, the whole table lamp will be discarded even if the base and the support are still usable, which is wasteful and fails to conform to the environmental protection requirements.

SUMMARY OF THE INVENTION

In view of the above problems that the conventional table lamps is too large to be conveniently carried and transported, the parts of the table lamp cannot be rotated arbitrarily to provide a better lighting effect, and the embedded-type lamps are not environmentally friendly, one of the primary objects of the present invention is to provide a table lamp with small volume and low thickness (height), where the lighting sheet thereof (light-emitting unit) can be conveniently replaced to meet the environmental protection requirements, the parts of the table lamp can be conveniently rotated to provide a better lighting effect, and the table lamp can be easily stored, carried and transported.

To achieve the foregoing objective, the present invention provides a slim organic light-emitting diode (OLED) lamp, which includes a lamp holder, a support and a base. The base is connected to one end of the support and provided with a control unit capable of providing different levels of current. The lamp holder is connected to the other end of the support and provided with a slot adapted to receive a light-emitting unit manufactured by an organic light-emitting device technology. Both the base and the lamp holder are pivotally rotated about the support such that the lamp holder, the support and the base are compact in a plane. In other words, the lamp holder, the support and the base can be folded to be in the same plane, so the lamp holder, the support and the base can be close to and adjacent to one another. The light-emitting unit can be plugged into the lamp holder so as to conveniently replace the light-emitting unit. There is at least one rotation direction between the support and lamp holder, such that freedom degree of the illumination range for the light-emitting unit can be increased. There is at least one rotation direction between the support and the base, such that the distance between the lamp holder and the base can be adjusted. The control unit is applicable to various light-emitting units with different rating currents so as to adjust the brightness thereof.

In one embodiment of the present invention, a bi-directional hinge having a pivot axis is configured between the support and the base, so that the support and the base are able to rotate about the pivot axis, respectively, in order to adjust the distance between the lamp holder and the base.

In one embodiment of the present invention, a multi-directional hinge having a plurality of rotation axes is configured between the support and the lamp holder such that the support and the lamp holder are able to rotate about one of the plurality of rotation axes, respectively, so as to adjust the direction and angle between the lamp holder and the support.

In one embodiment of the present invention, the lamp holder comprises an upper cover and a lower cover assembled with the upper cover to form the slot therebetween and to partially house the multi-directional hinge. The lamp holder may further comprise an electrode portion provided at the bottom of the upper cover. Preferably, the electrode portion is connected to a circuit module of the light-emitting unit and further coupled to the control unit of the base via a signal wire in order to provide different levels of current for the light-emitting unit when the light-emitting unit is plugged into the slot, so the light-emitting unit can provide different brightness.

In some embodiments, the lamp holder comprises an upper cover, and a lower cover assembled with the upper cover to form the slot therebetween and to partially house the multi-directional hinge.

In certain embodiments, the lamp holder further comprises a mirror unit provided on a top surface of the upper cover, and a transparent unit provided at the bottom of the lower cover. In particular, the light emitted by the light-emitting unit is transmitted through the transparent unit.

In a preferred embodiment, shapes of two sides of the slot are different from each other and match shapes of two sides of the light-emitting unit, respectively. For example, the shapes of the upper side and the lower side of the slot are different from each other. The shape of the upper side of the slot matches that of the upper side of the light-emitting unit, and the shape of the lower side of the slot matches that of the lower side of the light-emitting unit.

In a further embodiment, the base further comprises an upper base cover; a lower base cover integrally combined with the upper base cover to form an accommodating space; a weight balancing unit mounted at a center position of the lower base cover in the accommodating space; a power supply unit disposed around the weight balancing unit in the accommodating space; and a touch control unit disposed around the weight balancing unit in the accommodating space. The power supply unit is powered by an external power source to further power the control unit, and the control unit powers the light-emitting unit and the touch control unit according to a control requirement thereof, and takes a control action according to a touch status of the touch control unit.

In some embodiments, the lamp holder, the support and the base form a rectangle, circular, elliptical or polygonal shape in the plane.

In summary, the lamp holder, the support and the base can be folded to be in the same plane to be close to and adjacent to one another in accordance with the present invention, so the slim OLED lamp can be conveniently stored, carried and transported. Also, the lamp holder provides the slot for the light-emitting unit to be plugged into, so the light-emitting unit can be conveniently replaced when the light-emitting unit malfunctions, which conforms to the environmental protection requirements. Furthermore, the lamp holder, the support, and the base can move in relation to one another, such that the light source of the light-emitting unit on the lamp holder can be easily adjusted to provide proper lighting effect for the targeted zone.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF THE PREFERRED EMBODIMENTS

The following description is about embodiments of the present invention; however, it is not intended to limit the scope of the present invention.

Figure 1:
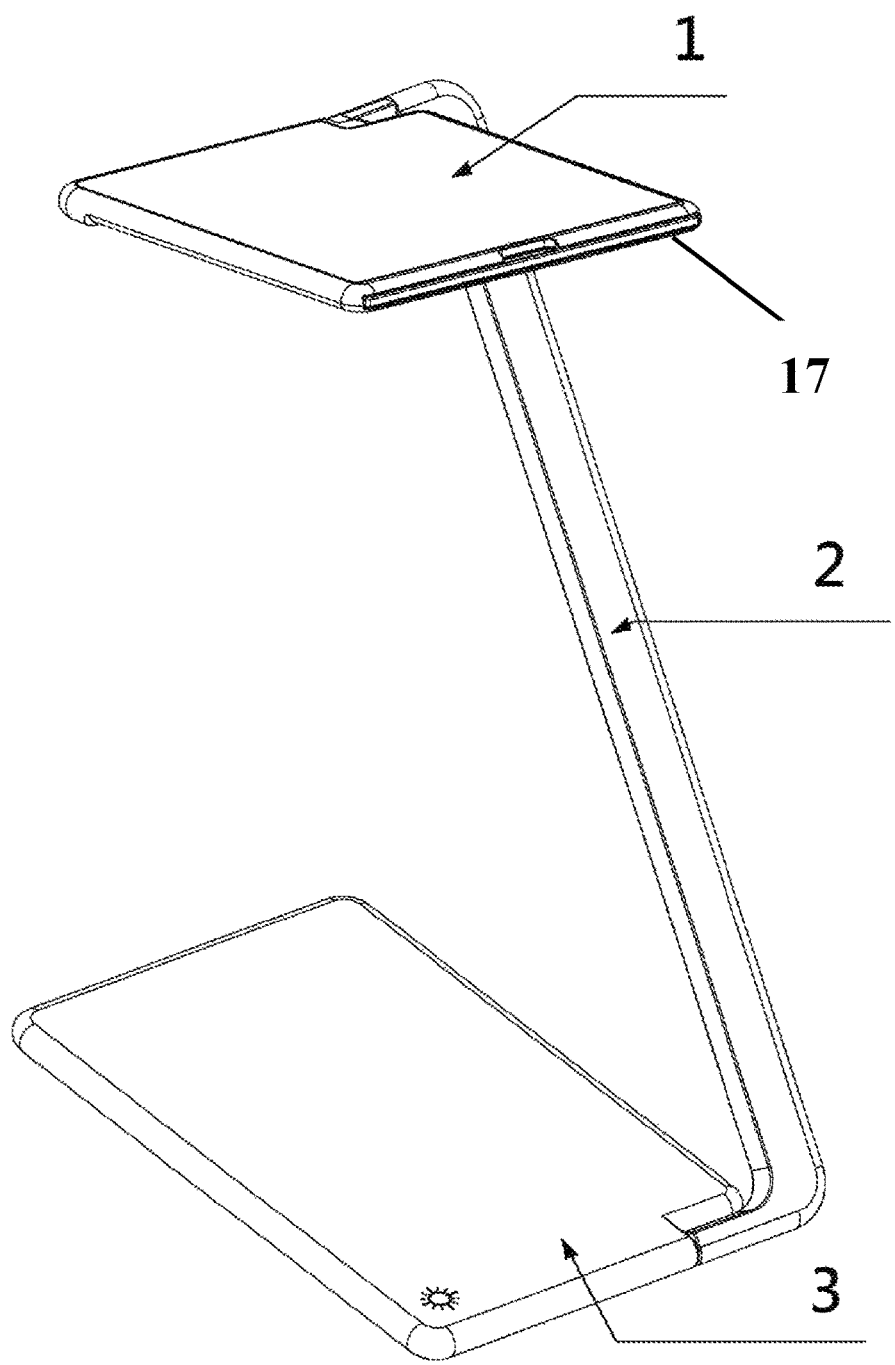
FIG. 1 is a perspective view of a slim OLED lamp in unfolded status in accordance with one embodiment of the present invention.
Figure 2:
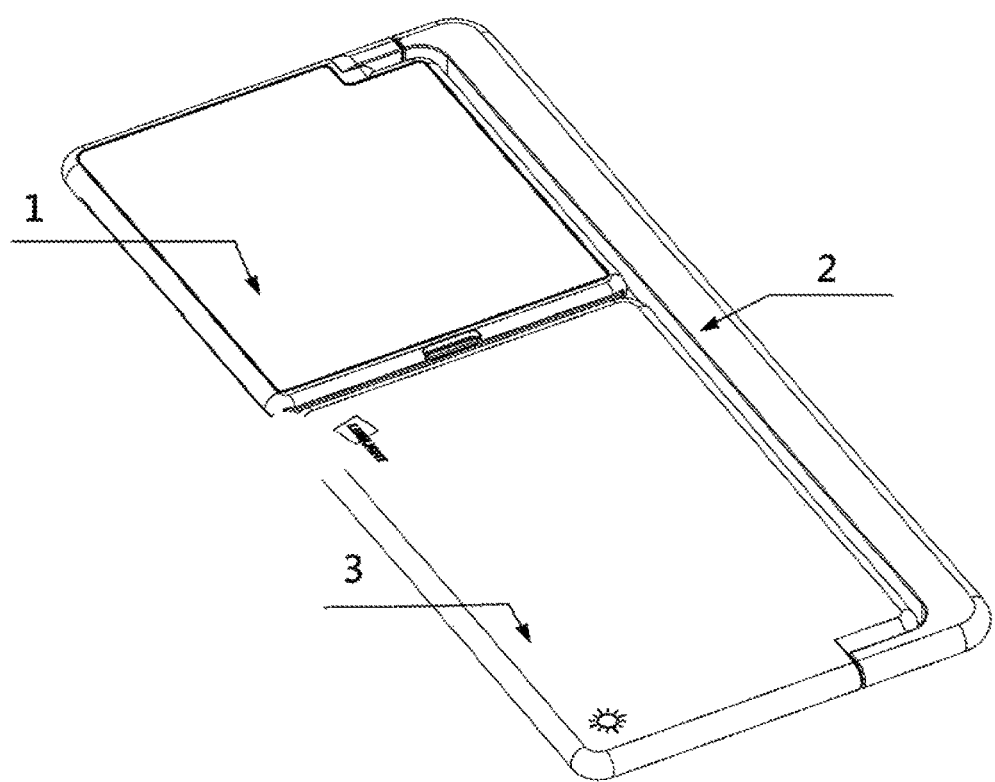
FIG. 2 is a perspective view of the slim OLED lamp in folded status in accordance with one embodiment of the present invention.
Figure 3:
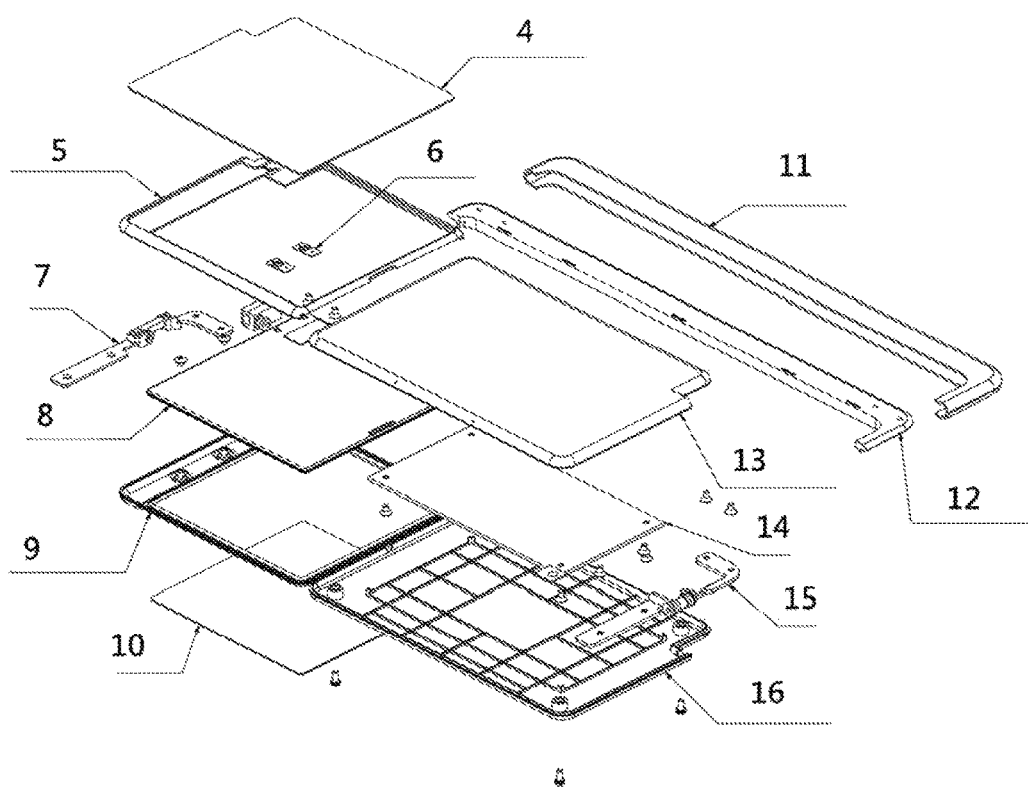
FIG. 3 is an exploded view of the slim OLED lamp in accordance with one embodiment of the present invention.

Please refer to FIGS. 1-3, which show a slim OLED lamp in accordance with one embodiment of the present invention. The slim OLED lamp includes a lamp holder 1, a support 2 and a base 3. The base 3 is pivotally connected to one end of the support 2 via a bi-directional hinge 15, and the lamp holder 1 is pivotally connected to the other end of the support 2 via a multi-directional hinge 7. In this way, the support 2 and the base 3 can move in relation to each other along the rotation axis provided by the bi-directional hinge 15 so as to adjust the distance between the lamp holder 1 and the base 3. Similarly, the support 2 and the lamp holder 1 can move in relation to each other along several rotation axes provided by the multi-directional hinge 7 so as to adjust the direction and angle between the lamp holder 1 and the support 2. The relative movement described in the disclosure means not only that the support 2 and the base 3, or support 2 and the lamp holder 1 are operated to simultaneously move, but also means that the support 2 is operated to move while the base 3 does not move, and vice versa, or the lamp holder 1 is operated to move while the support 2 does not move, and vice versa.

In one embodiment of the present invention, as shown in FIG. 2, both the base 3 and the lamp holder 1 are pivotally rotated about the support 2 such that the lamp holder 1, the support 2 and the base 3 are compact in a plane. The base 3, the support 2 and the lamp holder 1 have the same thickness (height) equal to or lower than 1 cm (≤1 cm), and the total length of the lamp holder 1 and the base 3 is just equal to the length of the support 2. Besides, the connection position of the support 2 and the base 3 and the connection position of the support 2 and the lamp holder 1 make the lamp holder 1, the support 2, and the base 3 be folded to be in the same plane and close to and adjacent to one another. In the embodiment, the lamp holder 1, the support 2 and the base 3 are folded to be a rectangle; however, in another embodiment, the lamp holder 1, the support 2 and the base 3 may be folded to be any other geometrical shapes (e.g. circular, elliptical or polygonal), or various patterns; all the ways of folding the lamp holder 1, the support 2, and the base 3 to be in the same plane are within the scope and spirit of the present invention set forth in the claims.

In one embodiment of the present invention, as shown in FIG. 3, the lamp holder 1 includes a mirror unit 4, an upper cover 5, a lower cover 9, and a transparent unit 10. The mirror unit 4 is disposed on the top of the upper cover 5, where the mirror unit 4 is formed by electroplating the surface of a flat plate. The thickness of the mirror unit 4 is equal to or less than 0.1 cm (≤0.1 cm). The bottom of the upper cover 5 is assembled with the top of the lower cover 9, and a slot 17 is formed between the upper cover 5 and the lower cover 9. The light-emitting unit 8 manufactured by the organic light-emitting device technology may be plugged into the slot 17, so the light-emitting unit 8 can be conveniently replaced. In addition, the multi-directional hinge 7 is partially covered by the upper cover 5 and the lower cover 9. Further, the shapes of two sides of the slot 17 are different from each other, and the shapes of two sides of the light-emitting unit 8 match the shapes of the two sides of the slot 17, respectively. The above structure can effectively avoid incorrectly plugging of the light-emitting unit 8 into the slot 17 in a wrong direction.

Figure 4:
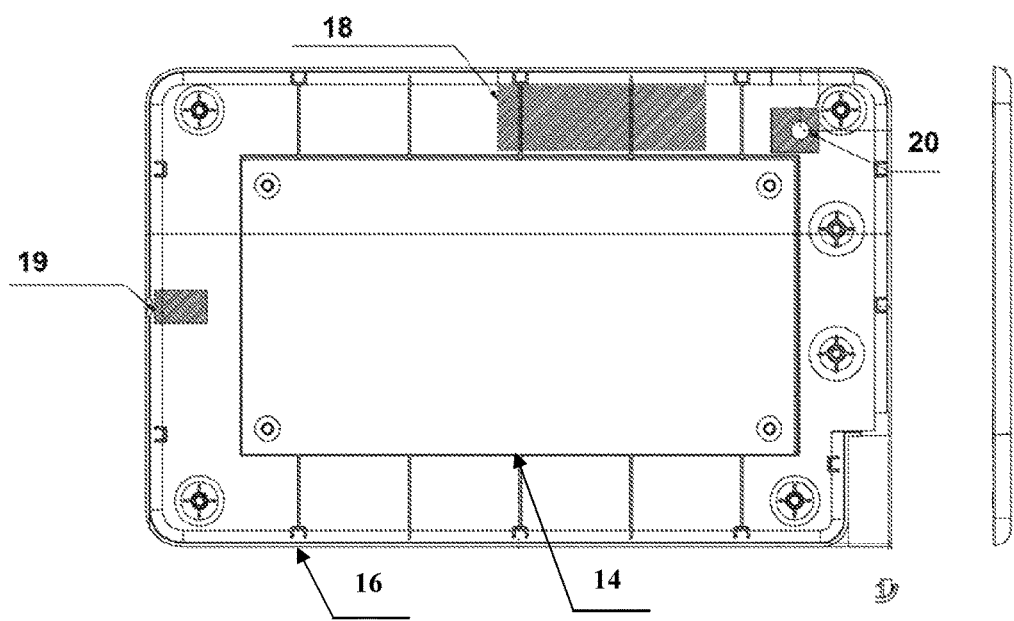
FIG. 4 is a schematic view showing the arrangement of the lower base cover, the weight balancing unit, the control unit, the power supply unit, and the touch control unit of the slim OLED lamp in accordance with one embodiment of the present invention.

Furthermore, the bottom of the upper cover 5 is provided with an electrode portion 6, which can be a conductive elastic sheet. The electrode portion 6 is connected to the circuit module of the light-emitting unit 8, and is further connected to the control unit 18 (as shown in FIG. 4) of the base 3 via a signal wire. In this way, when the control unit 18 transmits a control signal (e.g. power signals with different levels of current) to the light-emitting unit 8, the brightness of the light-emitting unit 8 can be adjusted to be corresponding to the control signal. The transparent unit 10 is disposed on the bottom of the lower cover 9, and may be a tempered glass, an optical lens (which may be made of plastics or glass) or a transparent plastic plate, etc., so the light emitted by the light-emitting unit 8 can be projected to the space outside the transparent unit 10.

In the embodiment, as shown in FIG. 3, the support 2 includes a casing 11 and a supporting body 12. One end of the supporting body 12 is connected to the bi-directional hinge 15, and the other end thereof is connected to the multi-directional hinge 7. The casing 11 partially covers the supporting body 12, the bi-directional hinge 15, and the multi-directional hinge 7 so as to beautify the appearance of the support 2 and provide the space for containing the signal wires between the circuit module of the light-emitting unit 8 and the control unit 18.

In the embodiment, as shown in FIG. 3 and FIG. 4, the base 3 includes an upper base cover 13, a lower base cover 16, a weight balancing unit 14, a control unit 18, a power supply unit 19, and a touch control unit 20. The upper base cover 13 and the lower base cover 16 are integrally combined with each other to form an accommodating space. The weight balancing unit 14 is disposed in the accommodating space and fixed at the center of the lower base cover 16. The control unit 18, the power supply unit 19, and the touch control unit 20 are disposed around the weight balancing unit 14 in the accommodating space. The power supply unit 19 is powered by an external power source to further power the control unit 18. Then, the control unit 18 powers the light-emitting unit 8 and the touch control unit 20 according to the control requirements thereof, and the touch control unit 20 takes the control action according to the touch status thereof, such as turning on the power supply, turning off the power supply, adjusting the current supplied to the light-emitting unit 8 (i.e. the aforementioned power signals with different levels of current), etc.

In summary, the lamp holder 1, the support 2, and the base 3 in accordance with the present invention can be folded to be in the same plane so as to make the lamp holder 1, the support 2, and the base 3 close to and adjacent to one another, which can significantly reduce the volume of the slim OLED lamp when compared with conventional table lamps and foldable table lamps; in this way, the slim OLED lamp in accordance with the present invention can be conveniently stored, carried, and transported. Also, the light-emitting unit 8 can be plugged into the slot 17, so the light-emitting unit 8 can be conveniently replaced when the light-emitting unit 8 malfunctions, which meets environmental protection requirements. Furthermore, the lamp holder 1, the support 2, and the base 3 can move in relation to one another via the bi-directional hinge 15 and the multi-directional hinge 7, so the light source of the light-emitting unit 8 in the lamp holder 1 can be easily adjusted to provide proper lighting effect for the targeted zone.

The above disclosure is related to the detailed technical contents and inventive features thereof. Those skilled in the art may make a variety of modifications and replacements based on the disclosures and suggestions of the invention as described without departing from the spirit thereof. Although such modifications and replacements are not fully disclosed in the above descriptions, they have substantially been covered by the following claims.

What is claimed is:

1. A slim OLED lamp, comprising:
    a support;
    a base connected to one end of the support and provided with a control unit capable of providing different levels of current; and
    a lamp holder connected to the other end of the support and provided with a slot adapted to receive a light-emitting unit manufactured by an organic light-emitting device technology;
    wherein both the base and the lamp holder are pivotally rotated about the support such that the lamp holder, the support and the base are compact in a plane.

2. The slim OLED lamp of claim 1, wherein a bi-directional hinge having a pivot axis is configured between the support and the base, whereby the support and the base are able to rotate about the pivot axis, respectively; and a multi-directional hinge having a plurality of rotation axes is configured between the support and the lamp holder such that the support and the lamp holder are able to rotate about one of the plurality of rotation axes, respectively.

3. The slim OLED lamp of claim 2, wherein the lamp holder comprises:
    an upper cover; and
    a lower cover assembled with the upper cover to form the slot therebetween and to partially house the multi-directional hinge.

4. The slim OLED lamp of claim 3, wherein the lamp holder further comprises:
    a mirror unit provided on a top surface of the upper cover; and
    a transparent unit provided at the bottom of the lower cover; wherein light emitted by the light-emitting unit is transmitted through the transparent unit.

5. The slim OLED lamp of claim 3, wherein shapes of two sides of the slot are different from each other and match shapes of two sides of the light-emitting unit, respectively.

6. The slim OLED lamp of claim 3, further comprising an electrode portion provided at the bottom of the upper cover, wherein the electrode portion is connected to a circuit module of the light-emitting unit and further coupled to the control unit via a signal wire.

7. The slim OLED lamp of claim 2, wherein the base further comprises:
    an upper base cover;
    a lower base cover integrally combined with the upper base cover to form an accommodating space;
    a weight balancing unit, mounted at a center position of the lower base cover in the accommodating space;
    a power supply unit disposed around the weight balancing unit in the accommodating space; and
    a touch control unit disposed around the weight balancing unit in the accommodating space;
    wherein the power supply unit is powered by an external power source to further power the control unit, and the control unit powers the light-emitting unit and the touch control unit according to a control requirement thereof, and takes a control action according to a touch status of the touch control unit.

8. The slim OLED lamp of claim 1, wherein the lamp holder, the support and the base form a rectangle, circular, elliptical or polygonal shape in the plane.

* * * * *